United States Patent
Bauer et al.

(10) Patent No.: US 7,039,108 B2
(45) Date of Patent: May 2, 2006

(54) METHOD AND DEVICE FOR CODING AND DECODING IMAGE SEQUENCES

(75) Inventors: Sven Bauer, Hildesheim (DE); Peter Siepen, Oberhausen (DE); Bernd Schmale, Hildesheim (DE); Marco Boltz, Hildesheim (DE); Guido Heising, Berlin (DE); Aljoscha Smolic, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 596 days.

(21) Appl. No.: 09/965,023

(22) Filed: Sep. 27, 2001

(65) Prior Publication Data
US 2002/0064226 A1    May 30, 2002

(30) Foreign Application Priority Data
Sep. 29, 2000    (DE) .............................. 100 48 735

(51) Int. Cl.
*H04N 7/12* (2006.01)

(52) U.S. Cl. ................................. 375/240.08; 382/243
(58) Field of Classification Search .......... 375/240.08, 375/293, 240.16, 240.01, 240.29, 240.13; 382/251, 243, 249; 345/519; 348/419.1, 348/445

See application file for complete search history.

(56) References Cited

U.S. PATENT DOCUMENTS
3,760,277 A * 9/1973 Whang ....................... 375/293
(Continued)

FOREIGN PATENT DOCUMENTS
EP          0 346 635 A2    12/1989
(Continued)

OTHER PUBLICATIONS

"MPEG-4 Video Transmission Over DAB/DMB: Joined . . . ", A. Smolic al, Proc. MOMUC'98, International Workshop on Mobil Multimedia Communication, Berlin, Germany, Oct. 12-14, 1998.

(Continued)

*Primary Examiner*—Gims Philippe
(74) *Attorney, Agent, or Firm*—Michael J. Striker

(57) ABSTRACT

In the method of coding according to the invention whether or not a predetermined encoder capacity parameter has been reached is tested prior to the actual coding of an image sequence. A reduction of the coding format can take place when the capacity parameter has been reached. The coding is then performed in this reduced coding format. This method can be combined with any coding process, since it does not need to intervene in the actual coding process that is used.

11 Claims, 2 Drawing Sheets

U.S. PATENT DOCUMENTS

| | | | | |
|---|---|---|---|---|
| 5,488,483 A | * | 1/1996 | Murayama | 382/251 |
| 5,990,955 A | * | 11/1999 | Koz | 375/240.01 |
| 6,437,787 B1 | * | 8/2002 | Wu | 345/519 |
| 6,621,865 B1 | * | 9/2003 | Yu | 375/240.16 |
| 6,760,770 B1 | | 7/2004 | Kageyama | |

FOREIGN PATENT DOCUMENTS

| | | |
|---|---|---|
| EP | 0 563 778 A1 | 10/1993 |
| EP | 0 798 930 A2 | 10/1997 |

OTHER PUBLICATIONS

"MPEG-4 Video VM 16.0", DOC, N 3312, Noordwijkerhout, Niederlands, Mar. 2000.

Patent Abstracts of Japan JP 2001134618 Jul. 6, 2004.

"Dymanic Resolution Conversion" in MPEG-4, Reduced Resolution Update Mode, ITU SG 16 Q.15 Video Coding for Low Bit Rate Communication, ITU-T Recommendation H. 263, Draft Jan. 27, 1998. pp. 1-154.

* cited by examiner

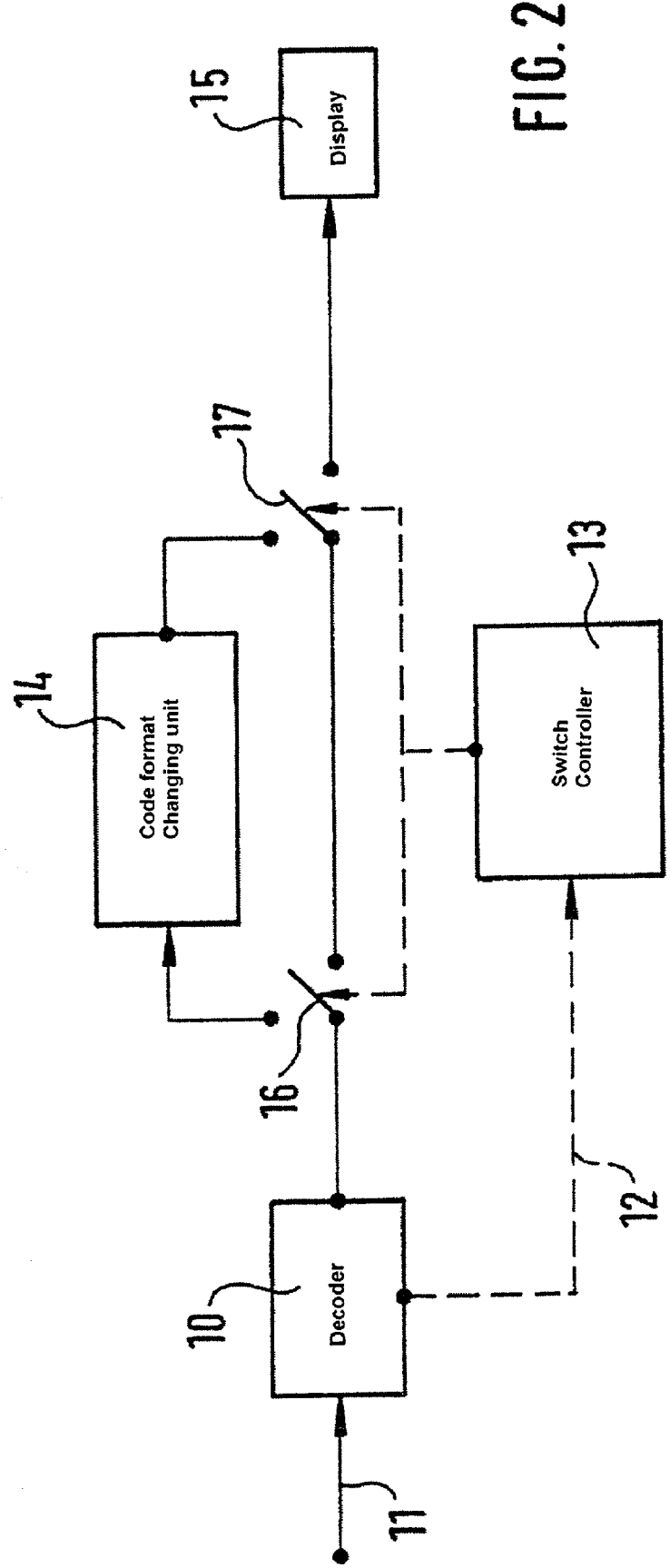

METHOD AND DEVICE FOR CODING AND DECODING IMAGE SEQUENCES

BACKGROUND OF THE INVENTION

1. Field of the Invention

The present invention relates to methods of coding and decoding image sequences and to coding and decoding devices for those purposes.

2. Description of the Related Art

MPEG Standards of the ISO (MPEG-1, MPEG-2 and MPEG-4) or H.26× Standards of the ITU-T (H.261, H.263) are currently used for video coding. It is possible to compress a digital video sequence with a predetermined picture size and picture repetition rate and to reconstruct the original sequence from the resulting bit stream with quality loss. The quality loss depends essentially on the compression degree, i.e. the ratio of the input data rate to the output data rate of the decoder. However the image content to be coded and the coding process that is used have a great influence on the quality of the reconstructed video. The quality can be controlled in two ways in the above-described method according to the requirements of the application. Either an approximately constant image quality is established, in which coding with a variable bit rate results because of the fluctuating complexity of the image content, or an approximately constant data rate is established, whereby a fluctuating picture quality results. Most applications require a coding according to the second case, in which the data rate is controlled.

The respective encoder performs the data rate control. However none of the standards provide norms. However mechanisms are set up and made available for influencing the reconstruction quality and thus the resulting data rate. The most common control methods involve variation of the quantization parameter (QP) for coding the transformation coefficient. In MPEG-4 Standard as described in "MPEG-4 Video Transmission over DAB/DMB: Joined Optimization of Encoding and Format Conversion" by A.Smolić, K. Rümmler, J. -R. Ohm, R. Schäfer and S. Bauer, Proc. MOMUC' 98, International Workshop on Mobile Multimedia Communication, Berlin, Germany Oct. 12–14, 1998, a change of the parameter with reference to the previous quantization parameter (QP) can be transmitted with each macroblock. The absolute QP can be transmitted in MPEG-2 and H.263 according to ISO/IEC/JTC1/SC29/WG11, in "MPEG-4 Video VM 16.0", Doc. N3312, Noordwijkerhout, Niederlands, March 2000. The quantization parameter QP can take 32 different values, whereby a macroblock with 32 different quality and bit rates can be coded. The change of the number of images to be coded is one additional element for rate control. A maximum bit rate at which the coding should proceed is established at the beginning of the coding by the user, for example only every second image of the image sequence should be coded. On the other hand, individual images can be omitted as required in some coding processes. These so-called frame skips are most used when an additional increase of the QP is no longer possible or leads to an unacceptable picture quality.

In video coding with a predetermined fixed bit rate it is necessary to control the encoder so that the required bit rate is maintained and at the same time the best image quality is achieved. This encoder control is called rate control. The primary means for adjusting the bit rate is the quantization (quantization parameter QP), which varies according to the already consumed bits. Coarse quantization of the structure and motion of complex video material is easy. This can generally lead to interfering or troublesome block artifacts with very complex content. In the extreme case however the required bit rate cannot be maintained in spite of the coarsest quantization. In this case individual images may be omitted, i.e. that is not coded and transmitted. Instead of this the previous image is frozen. This sort of frame skipping generally leads to extremely annoying bucking or jerking effects, especially with video in line-jump format, in which the motion appears jerky or discontinuous because of the temporal displacement of both half images.

EP 0 346 635 B1 discloses that it is known to transfer or transmit only that image block which has the greatest residual errors according to the filling state of the bit stream buffer during the coding.

In order to prevent frame skipping the possibility exists to code the image sequence in one of the foregoing formats, which practically exclude the occurrence of frame skipping, i.e. to use a suitably reduced temporal and spatial resolution. Experiments have generally shown that the subjective quality increases with increasing resolution of the coding format, as explained by A.Smolić, ibid. Thus an optimization problem exists for the coding format, whose opposing factors are the avoidance of frame skipping in standard video image sequences with both complex and coarse quality. The use of a fixed coding format must therefore involve a compromise.

SUMMARY OF THE INVENTION

It is an object of the present invention to provide methods and devices for coding and decoding image sequences of the above-described type to overcome the above-described disadvantages.

It is another object of the present invention to provide methods and devices for coding and decoding image sequences of the above-described type that avoid the above-mentioned compromise.

According to the invention the method of coding an image sequence comprises:

a) testing whether or not an actual image of a video image sequence has reached or exceeded a predetermined capacity parameter for a capacity of an encoder performing the coding of the image sequence prior to performing the coding; and b) performing a reduction of a coding format used in the coding so as to reduce resolution for a portion of the image sequence coded and coding the actual image with the coding format after the reduction when the capacity parameter has been reached or exceeded.

The method of decoding an image sequence according to the invention includes:

a) testing whether or not the actual image was subjected to reduction of a coding format for the actual image after or during the decoding of the actual image; and b) performing a large-scale interpolation of the coding format for the actual image when the actual image was subjected to the reduction of the coding format.

The coding format is automatically varied and thus adjusted to the content of the video sequence according to a switching criterion, which is derived from the capacity parameters of the encoder, such as the filling state of the bit buffer and/or the quantization parameter QP. When the switching criterion indicates that complex material is present (higher filling state of the bit buffer, greater quantization), frame skipping is prevented, since the coding format is reduced, i.e. the horizontal and, if necessary, also the vertical resolution of the input signal of the decoder is reduced by filtering and sub-sampling. The full resolution is used during normal coding and thus maximum quality is guaranteed. Also suitable switching criteria are required for less than full resolution.

The invention provides a process, which permits an adaptive reduction of the output data rate independently of the coding method that is used. This adaptation can, for example, occur based on the actual filling state of the bit stream buffer, with the aim of preventing underflow or overflow of the buffer. Because of this feature the available channel bandwidths can react easily dynamically to the temporal changes. Also the coding can better capture the called-for temporal fluctuations of the resulting bit rate.

The above-described method has the essential advantage that it can, in principle, be combined with every video coding process, since it is not necessary for it to intervene in the coding process itself. The three main elements of the method are not part of the coding process. These three elements are a) an adaptive controlled sub-sampling of the input image sent to the encoder that is combined with a syntactic restarting of the coding at each change of resolution; b) a suitable decoding-side adaptive over-sampling of the decoded image at reduced resolution and c) a mechanism for transmission of auxiliary information, as the individual decoded video segments must be assembled in a connected sequence with only one image resolution. The transmission of the auxiliary information is not necessarily required, however in this embodiment the decoder, or a compositor downstream of the decoder that adds the individual sequence segments together again to form a video with a predetermined resolution, must know this information. It is of advantage, however, that access to the parameter, which reproduces the actual state of the encoder, in order to be able to improve the decisions regarding the image resolution to be selected, is not necessarily required.

This method according to the invention produces an improvement in comparison to the currently known coding methods, since an additional reduction of the data rate is also made possible. Thus it is possible, for example, to avoid the visually annoying or troublesome frame skips, when it is not possible to do so with most known methods.

An operable data rate control can be produced with the above-described coding method elements for most applications. The quality of the decoded videos depends however very greatly on the control of the individual elements, i.e. on the decisions regarding when and in which form each element is used for reducing the data rate. The fact that each of the three elements has a different effect on the picture or image quality should be considered. The increase of QP leads to increasingly observable interference with the images. Very annoying or troublesome jumping or discontinuous motions result from the frame skipping, since the omitted image is compensated for by temporarily freezing the previously coded image. The coding by reducing the spatial resolution leads to images with reduced detail, which are not sharp. The impression of these defects or imperfections on the observer is usually at least unpleasant. The frame skipping leads to a significantly or greatly damaged subjective impression and thus must be avoided. If the currently known methods are used in a coding process with the highest possible QP, which does not already provide a mode for resolution reduction coding, it is hardly possible to reduce the data rate without frame skipping. For these coding methods the use of the advantageous methods of the invention outside of the coding method itself avoids the need for frame skipping.

A process is available with Version 2 of the Standard MPEG-2 and with H.263, which can be used for reduction of the data rate. The method designated "Dynamic Resolution Conversion" in MPEG-4 is designated as "Reduced Resolution Update Mode" in an easily modified form in H.263 Annex Q (see ITU SG 16 Q. 15 "Video Coding for Low Bit rate Communication, ITU-T Recommendation H.263", Draft Jan. 27, 1998). The first is currently only supported in "Advanced Realtime Simple Profile" (ARTS) of MPEG-4. In this process an image is either coded with a local resolution corresponding to the original or with a resolution reduced by a factor of two in each direction. Because of that the number of macroblocks to be coded is reduced by a factor of four, whereby the bit number is also reduced. For the case of coding with reduced resolution however the size of the input image prior to coding is not reduced as in the present invention, but only the predicted omitted image is locally reduced after derivation of the temporary prediction of the original, both of which are present at the original resolution, by means of a sub-sampling filter. The reconstructed omitted image is again brought to its original size by means of an over-sampling filter after inverse transformation on the encoder-side and decoder-side and added with the prediction to form the output image. It is thus made available in its original resolution independently of the resolution during the coding.

A reduction of the coding format can be performed according to the invention in a serially connected module, so that the method of the invention is independent of the video coding process that is used.

The process according to the invention differs from the previously described dynamic resolution conversion method in MPEG-4 and reduced resolution update mode in H.263 in many aspects or points. Both methods can only then be used in a standard-compliant manner when a suitable application profile of the standard is selected, which contains the process. If another profile is selected, the process cannot be used, or if in any case it is used in spite of that, a non-standard-compliant bit stream is produced, which cannot be decoded by the form decoder. The bit stream produced with the method of the invention however can be decoded by the associated compliant decoder. Both standardized methods, dynamic resolution conversion and reduced resolution update mode, could only be modified if the standard is also changed. This limitation does not extend to the invention. With the invention it is possible, for example, to perform the resolution reduction only in a local direction or to facilitate a series of different sub-sampling factors and filters and to transmit auxiliary information. The standardized methods are however limited to a subsampling by a factor of 2 in each local direction and to the use of a predetermined filter.

The use of the invention is not connected to a special input format or a special line data rate. Moreover the principle of relative reduction of the horizontal and, if necessary, vertical resolution, controlled by the switching criteria associated with the respective line data rate, can be arbitrarily combined with each input format and transmission channel.

The conversion of the coding format is preferably accomplished when the coding process is completely reinitialized. In MPEG-4 encoder, for example, a new VOL header and an INTRA-coded image are transmitted. Thus it is apparent from the respective bit stream that it is a matter of a reduced format that must be again increased or augmented in the decoder. The signaling must thus take place in the system mode, or the coding format, which must be processed (i.e. increased), must be known to the respective decoder.

BRIEF DESCRIPTION OF THE DRAWING

The objects, features and advantages of the invention will now be illustrated in more detail with the aid of the following description of the preferred embodiments, with reference to the accompanying figures in which:

FIG. 2 is a block diagram of a decoding device according to the invention.

DETAILED DESCRIPTION OF THE INVENTION

Figure 1:
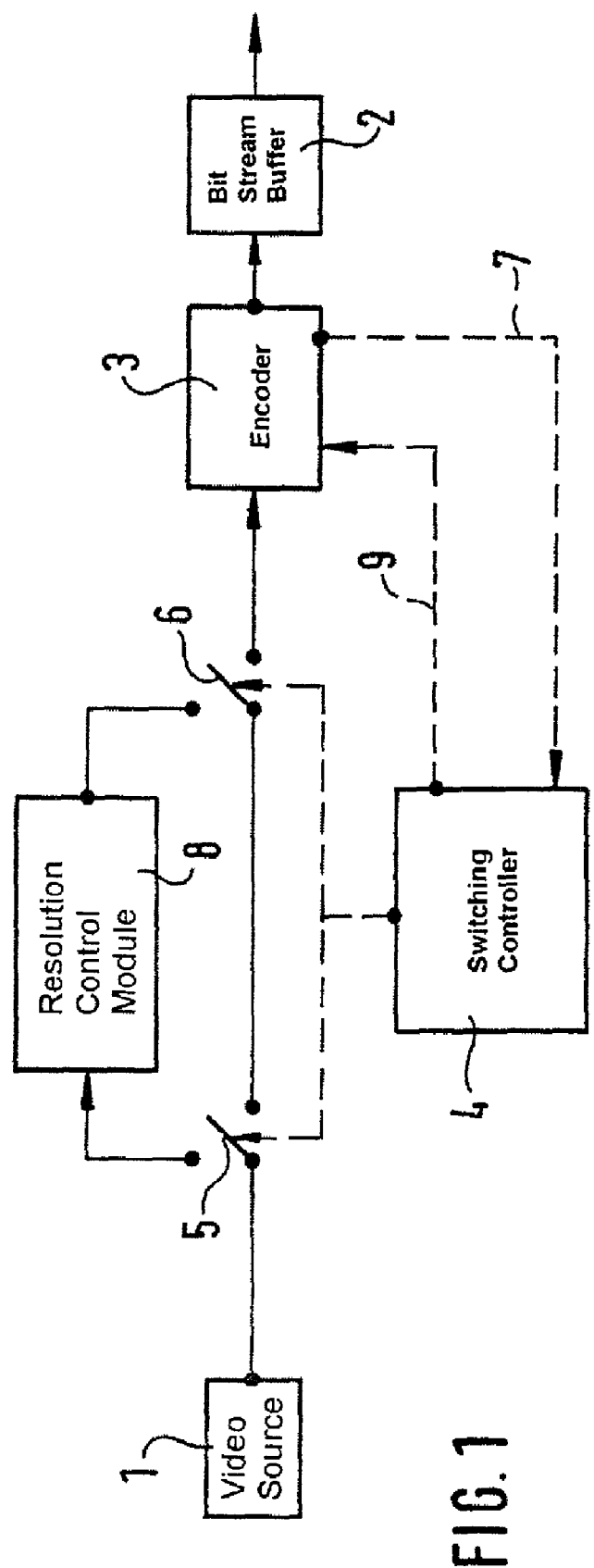
FIG. 1 is a block diagram of a coding device according to the invention.

The invention is illustrated in more detail using an example of MPEG-4 coding. By way of example a source format of CCIR601 is described as the input format with a data rate of 1.5 Mbit/s. Instead of MPEG-4 the invention can also be used with other video coding processes, e.g. MPEG-2 or H.263.

Prior to the coding of each individual image of the input image sequence, which is supplied by the video source 1 in FIG. 1 (except for the first image), a decision is made regarding a reduction of the resolution at the output of the encoder 3 with the aid of buffer filling state of the bit stream buffer 2. This buffer filling state regulates itself by means of the bits used during coding of the previous image and the average bits per image. Because of that feature the buffer always fluctuates because of the difference between the expected and the actually required bits. When the buffer exceeds a predetermined percentage of its maximum filling state acting as a capacity parameter, a reduction of resolution takes place.

In the event that a decision regarding a reduction of resolution is negative because the buffer filling state is in an uncritical range, the subsequent coding proceeds with the full resolution. The video source is then connected directly with the input of the encoder 3 by means of the switches 5 and 6.

In the event the decision regarding resolution reduction is positive, a sub-sampling of the original image input from the input image sequence takes place in subsequent processing. The luminance and chrominance components of the input image are reduced in their horizontal as well as vertical sizes by one half. If necessary only one horizontal sub-sampling is performed. In this case the switching controller 4 of the encoder 3 receives a switching command so that both switches 5 and 6 are controlled so that a resolution control module 8 for reduction of the coding format is connected in the signal path between the video source 1 and the encoder 3.

The subsequent coding is then performed at reduced resolution, i.e. so that much less input data (pixel and macroblock number) needs to be processed.

Since the resolution control module 8 is not an integral part of the encoder 3, but may be combined with a variety of different video encoders, the reduction of resolution occurring cannot be signaled in the video bit stream. The respective encoder session is interrupted and a new session with a new format is initialized. In the case of an MPEG-4 encoder the actual Video Object Layer (VOL) is interrupted and a new VOL header written. The switching of the switches 5 and 6 by the signal 9 initializes this new VOL header. The new VOL begins with an INTRA-coded image in new format (i.e. independently of other images coded, no temporary prediction).

The signaling of the switching occurs either in the system mode (e.g. by MPEG-4 scene composition information) or must be known in the decoder in the respective system, which is to be processed with the coding format used for the display. Thus every smaller coding format is suitably increased e.g. with a display in the CCIR601 format. The decoded video at this point is somewhat blurred or not sharp. For that reason the block artifacts are reduced, and frame skipping is prevented.

Prior to processing the next image the required quantity of bits required for the coding of the image is registered for regulation of the buffer filling state and added into the buffer. At the same time the average bit quantity is subtracted.

When the filling state of the buffer is again lowered under a predetermined limit by the lower number of bits, the system loops back to the full resolution.

Also the actual VOL is again interrupted and a new encoder session initialized by writing a new VOL header with the full resolution. The sub-scanning is then no longer required.

A hysteresis mechanism limits this switching back to the original mechanism or return to the original resolution. This mechanism insures that a certain (definable) minimum number of individual images of the sequence must remain unchanged with the original resolution, independently of the buffer filling state. Too frequent switching back and forth, which can otherwise produce an unpleasant flickering effect, is prevented in this way.

Decoder 10 (e.g. according to MPEG-4) receives and decodes the incoming bit stream 11 (FIG. 2). The video is available at its output in coded format. As already mentioned, a possible format reduction either is signaled (12) in the system mode or the code format to be processed (i.e. augmented or increased) must be known in the respective decoder 10. In the latter case the switching or control by the switch controller 13 occurs directly and solely by means of the coding format.

If a reduced coding format is detected by the switch controller 13, the code format changing means or unit 14 is connected directly in the signal path between the decoder 10 and the display 15 by means of the switches 16 and 17. An image point interpolation is performed by the format changing means or unit 14 within those image regions, whose image information was thinned out previously by means of the resolution control module 8. Thus image information in the original source format, e.g. CCIR601, is fed to the display 15.

The adaptive resolution reduction is primarily triggered in sections of greater complexity in the video sequence to be coded. These sections are, above all, characterized by very great changes or motion in the scenes. Thus a reduction of the resolution is hardly conspicuous because of the subjectively blurring motions present.

Selected test material, in which up to 20% of the individual images were skipped, with conventional coding without adaptive resolution reduction, i.e. a fixed coding format, was used in numerous experiments or tests. This led to poorer subjective quality because of the described jerky effect and block artifacts, especially in sections with scene blending or rapid motion. Frame skipping could however be completely avoid using the adaptive resolution reduction according to the invention, in which up to 30% of the images were reduced in size. The subjective quality of the decoded video sequence could be considerably improved in this manner.

Additional encoder parameters, or combinations of different variables, could be used as switching criteria besides the filling state of the bit buffer. As already mentioned, the quantization parameter QP is varied during the rate control for adjustment of the required bit rate. The QP is closely related to the extent of coding effort and thus the content of the video sequence. It is a measure of the accuracy of the quantization. The greater the coding work in a section of the video sequence, the greater is the QP, which corresponds to a coarse quantization. More block artifacts result in that case. Thus the QP can be used directly as the switching criterion or it can be combined with the buffer filling state. Also only suitable threshold values or combined criteria must be used.

The type of sub-scanning provides additional flexibility for modifications of the adaptive resolution reduction in the scope of the invention. Alternatively to reduction of the horizontal and vertical resolution, only reduction of the horizontal size of the image is possible. It is especially significant in line-jump formats such as CCIR601, since the two temporally displaced half images already present a reduction of the vertical resolution. In principle, using a suitable sub-scanning filter, also with arbitrary reduction factor, is possible besides the halving of the format.

The disclosure in German Patent Application 100 48 735.1 of Sep. 29, 2000 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and device for coding and decoding image sequences, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of coding an image sequence, said method comprising the steps of:
   a) prior to performing said coding, testing whether or not an actual image of a video Image sequence has reached or exceeded a predetermined capacity parameter for a capacity of an encoder performing the coding of the image sequence; and
   b) performing a reduction of a coding format used in the coding so as to reduce resolution for a portion of the image sequence coded and coding said actual image with said coding format after said reduction when said capacity parameter has been reached or exceeded;
   wherein the reduction of the coding format comprises an adaptive sub-scanning with low-pass filtering of said actual image under control of said predetermined capacity parameter;
   wherein said coding is syntactically restarted after changing said coding format;
   wherein said encoder is an MPEG-4 encoder; and
   interrupting an actual video object layer, writing a new video object header and initializing a new video object layer with an INTRA-coded image in a new coded format when said coding format changes.

2. The method as defined in claim 1, wherein said encoder (3) is provided with a bit stream buffer (2) and said predetermined capacity parameter is at least one of a buffer filling state of said bit stream buffer (2) and a quantization parameter for the coding.

3. The method as defined in claim 1, wherein said encoder (3) is provided with a bit stream buffer (2) and said predetermined capacity parameter is a transformation coefficient for the coding.

4. The method as defined in claim 2, further comprising, prior to processing a following image for regulation of the buffer filling state, registering a required bit quantity for the coding of the actual image and adding the required bit quantity to the filling state of the bit stream buffer after subtracting an average bit quantity.

5. The method as defined in claim 4, further comprising looping back to a previous coding format with full resolution when the filling state of the bit stream buffer (2) moves under a predetermined limiting value after reduction of said coding format.

6. The method as defined in claim 1, further comprising raising said resolution by a plurality of resolution stages after said reduction of said resolution.

7. The method as defined in claim 6, further comprising a hysteresis mechanism for limiting coding format changes during the coding.

8. The method as defined in claim 6, wherein said encoder has a bit stream buffer and further comprising a hysteresis mechanism comprising limiting coding format changes to a minimum number for said images during said coding, independently of a filling state of said bit stream buffer.

9. The method as defined in claim 1, wherein said sub-scanning with said low-pass filter is performed at least in a horizontal direction.

10. The method as defined in claim 1, further comprising calling upon information for testing whether or not said actual image has been subjected to said reduction of said coding format and wherein said information is available to said decoder and is transmitted as system information.

11. The method as defined in claim 1, further comprising amplification of every reduced code format for said image sequence prior to reproduction on a decoder-side display device.

* * * * *